US012075910B2

(12) United States Patent
Stultz

(10) Patent No.: US 12,075,910 B2
(45) Date of Patent: Sep. 3, 2024

(54) STOW AWAY STOOL OR STOOP

(71) Applicant: Mark Raymond Stultz, Maple Grove, MN (US)

(72) Inventor: Mark Raymond Stultz, Maple Grove, MN (US)

( * ) Notice: Subject to any disclaimer, the term of this patent is extended or adjusted under 35 U.S.C. 154(b) by 0 days.

(21) Appl. No.: 17/667,771

(22) Filed: Feb. 9, 2022

(65) Prior Publication Data

US 2022/0265045 A1 Aug. 25, 2022

Related U.S. Application Data

(60) Provisional application No. 63/147,692, filed on Feb. 9, 2021.

(51) Int. Cl.
*A47B 83/00* (2006.01)
*E06C 1/00* (2006.01)

(52) U.S. Cl.
CPC .............. *A47B 83/00* (2013.01); *E06C 1/005* (2013.01); *A47B 2220/05* (2013.01)

(58) Field of Classification Search
CPC ...... A47B 83/00; A47B 2220/05; E06C 1/005
USPC ................................ 312/235.1; 182/91, 129
See application file for complete search history.

(56) References Cited

U.S. PATENT DOCUMENTS 2,197,266 A * 4/1940 Bror .......................... B60R 3/02 182/91
2,667,658 A * 2/1954 Cornick ................. A47B 83/00 297/423.14
3,481,429 A * 12/1969 Gaede ..................... E06C 1/005 182/88
3,756,678 A 9/1973 Klopfenstein
4,135,604 A * 1/1979 Ryan ......................... E06C 9/06 182/91
4,276,955 A 5/1981 Hickman
4,753,320 A * 6/1988 Walter .................. A47C 12/02 182/91

(Continued)

FOREIGN PATENT DOCUMENTS

CA 2712790 2/2012
CA 2851948 11/2014

(Continued)

*Primary Examiner* — James O Hansen
(74) *Attorney, Agent, or Firm* — McDonald Hopkins LLC

(57) ABSTRACT

Provided is a stool or stoop device that is easily transitioned between a stowed position within a cabinet and a deployed or in-use position outside of a cabinet. The stool may have a streamlined design and high ease of use so that the stool may be stowed away, set up, and utilized by children, in an example. The stool can accommodate multiple cabinet designs, floor surfaces and under-cabinet structures, such as drain traps and plumbing. The stool may be flat-boxed shipped and easily assembled and installed into a cabinet structure with minimal tools or training. In an embodiment, the stool may comprise at least two legs, wherein each leg includes a concaved or recessed portion, at least one step between and connecting the at least two legs, and a pivotable bracket for facilitating the transition between a stowed and deployed positions. The stool may be mounted to an interior of a cabinet or may include a weighted base that is positionable within the interior of the cabinet. The stool may include a cantilevered design.

18 Claims, 11 Drawing Sheets

(56) References Cited

U.S. PATENT DOCUMENTS

| | | | | |
|---|---|---|---|---|
| 4,757,876 | A * | 7/1988 | Peacock | E06C 1/52 182/95 |
| 4,924,970 | A * | 5/1990 | Seals | E06C 1/005 182/195 |
| 5,085,290 | A | 2/1992 | Guirlinger | |
| 5,131,492 | A | 7/1992 | Caminiti et al. | |
| 5,341,897 | A | 8/1994 | Gross | |
| 5,697,470 | A | 12/1997 | Carle | |
| 5,755,498 | A | 5/1998 | Cutler | |
| 5,967,255 | A * | 10/1999 | Young | A47B 5/06 297/14 |
| 6,003,633 | A * | 12/1999 | Rolson | E06C 5/02 182/127 |
| 6,012,694 | A * | 1/2000 | Sullivan, III | F16M 11/16 248/323 |
| 6,039,149 | A | 3/2000 | Bedja et al. | |
| 6,425,457 | B1 | 7/2002 | Undry | |
| 6,427,804 | B1 | 8/2002 | Lazarus | |
| 6,536,557 | B2 | 3/2003 | Gibson et al. | |
| 6,843,347 | B2 | 1/2005 | Lamberson et al. | |
| 6,880,673 | B1 | 4/2005 | Harris | |
| 7,017,708 | B1 | 3/2006 | Lynn | |
| 7,182,176 | B2 | 2/2007 | Gibson | |
| 7,716,757 | B2 * | 5/2010 | Sumpton | A47K 17/028 182/35 |
| 8,127,890 | B2 | 3/2012 | Meyers | |
| 8,341,806 | B2 | 1/2013 | Parker et al. | |
| 8,459,410 | B2 | 6/2013 | Parvizian et al. | |
| 8,925,682 | B2 | 1/2015 | Chitayat et al. | |
| 9,290,991 | B1 | 3/2016 | Mcdill | |
| 9,611,691 | B1 * | 4/2017 | Hunter | A47K 17/028 |
| 9,617,788 | B2 | 4/2017 | Goodson | |
| 9,986,843 | B2 | 6/2018 | Baker | |
| 10,058,187 | B2 | 8/2018 | Gibson | |
| 10,253,565 | B2 | 4/2019 | Cornthwaite | |
| 10,271,655 | B1 | 4/2019 | Gwen | |
| 10,316,584 | B1 | 6/2019 | Cooper | |
| 10,582,774 | B2 | 3/2020 | White | |
| 10,898,003 | B2 | 1/2021 | Samaraweera | |
| 10,941,616 | B2 | 3/2021 | Woodward | |
| 11,202,512 | B2 * | 12/2021 | Reid | A47K 17/028 |
| 2002/0096918 | A1 | 7/2002 | Russomanno | |
| 2004/0251080 | A1 | 12/2004 | Kalos | |
| 2008/0251317 | A1 | 10/2008 | Johnson | |
| 2008/0264723 | A1 | 10/2008 | Tatum et al. | |
| 2009/0294214 | A1 | 12/2009 | Vosbikian et al. | |
| 2010/0200334 | A1 | 8/2010 | Moldthan et al. | |
| 2011/0017547 | A1 | 1/2011 | Lee et al. | |
| 2012/0086317 | A1 | 4/2012 | Baran | |
| 2012/0234630 | A1 | 9/2012 | Havens | |
| 2013/0213738 | A1 | 8/2013 | Schroeder | |
| 2014/0111072 | A1 | 4/2014 | Camadella | |
| 2014/0131138 | A1 | 5/2014 | Simpson et al. | |
| 2015/0001005 | A1 * | 1/2015 | Goodson | A47B 77/00 182/96 |
| 2015/0083522 | A1 | 3/2015 | Chancler | |
| 2015/0090528 | A1 | 4/2015 | Binegar | |
| 2016/0309903 | A1 | 10/2016 | Huang et al. | |
| 2016/0338496 | A1 | 11/2016 | Dumont | |
| 2017/0226800 | A1 | 8/2017 | Barry | |
| 2017/0370148 | A1 | 12/2017 | Smith | |
| 2018/0334855 | A1 | 11/2018 | Kinkade | |
| 2019/0195015 | A1 | 6/2019 | Cornthwaite | |
| 2020/0170857 | A1 | 6/2020 | Baiera | |
| 2020/0237102 | A1 | 7/2020 | Boyer | |
| 2020/0300038 | A1 | 9/2020 | Pinnock | |
| 2020/0392787 | A1 | 12/2020 | Navarro | |

FOREIGN PATENT DOCUMENTS

| | | |
|---|---|---|
| CN | 110367709 | 10/2019 |
| CN | 106690912 | 7/2021 |
| EP | 1366692 | 3/2010 |
| FR | 3048447 | 7/2020 |
| GB | 1422671 | 1/1976 |
| GB | 2416687 | 2/2006 |
| WO | 2010121622 | 10/2010 |

* cited by examiner

STOW AWAY STOOL OR STOOP

CROSS-REFERENCE TO RELATED APPLICATIONS

This application claims priority to U.S. Provisional Patent Application No. 63/147,692 entitled "Stow-away Stoop" filed on Feb. 9, 2021, which is hereby incorporated by reference in its entirety.

TECHNICAL FIELD

The present invention relates generally to a stool or stoop device and, more particularly, to a stool or stoop device that is easily transitioned between an in-use position outside of a cabinet and a stored position within the cabinet.

BACKGROUND

Cabinets, countertops, sinks, vanities, and other mid-line furnishings are generally manufactured to a height of a certain mid-line range that is consistent for access and use by average height adults or persons. For example, standard counter height in kitchens and bathrooms can range from approximately 30 inches to 40 inches on average. For children or persons with a mid-line height that is shorter than or near to this standard counter height, it can be difficult or uncomfortable to access and use the counter and any amenities thereon.

In particular, it may be challenging for young children to initiate self-care and for their caregivers to teach fundamental hygiene habits, such as hand washing, brushing teeth, and other similar activities. Additionally, such height limitations may prevent a child's supervised participation in developmental and recreational activities, including cooking, cleaning, accessing or using items on a counter or table, and the like. The inability to gain a sightline over a counter can also present a hazard to a child, and may put the child at risk for losing their balance, falling, knocking items over or onto the child, or inadvertently contacting a dangerous item without being able to see it (e.g., hot curling iron, knife, scissors, etc.).

With standard counter heights in kitchens and bathrooms of approximately 30 inches or higher on average, adults often resort to an awkward grasping around the torso or seating the child on the counter in order to allow the child access and use the counter and any amenities thereon. Such solutions can prevent supervised independence and learning, may only be possible for short periods of time, and can actually increase the risk of potential hazards (e.g., falling from counter height). Traditional step stools can provide an alternative solution, but can be prone to marring cabinets, slipping while underfoot, causing trip hazards including when the traditional step stool is not in use, and may often be stored in an area that is inconvenient to access and set up in the desired location.

A need is therefore identified for an improved stool or stoop device that allows for easier, more convenient, and/or safer access to a sightline that is otherwise out of reach. The improved stool or stoop device may further include one or more, or all, of the following aspects: increase supervised independence of the child, increase stability of the step stool during use, provide easy and convenient access to the step stool and set up in the desired location, provide hidden storage of the step stool when not in use, and the like.

SUMMARY

The following presents a summary of this disclosure to provide a basic understanding of some aspects. This summary is intended to neither identify key or critical elements nor define any limitations of embodiments or claims. This summary may provide a simplified overview of some aspects that may be described in greater detail in other portions of this disclosure. Furthermore, any of the described aspects may be isolated or combined with other described aspects without limitation.

Described is a stool or stoop device that is easily transitioned between a stowed position within a cabinet and a deployed or in-use position outside of a cabinet. The stool may have a streamlined design and high ease of use so that the stool may be stowed away, set up, and utilized by children, in an example. The stool can accommodate multiple cabinet designs, floor surfaces and under-cabinet structures, such as drain traps and plumbing. The stool may be flat-boxed shipped and easily installed into a cabinet structure with minimal tools or training. In an embodiment, the stool may comprise at least two legs, wherein each leg includes a concaved or recessed portion, at least one step between and connecting the at least two legs, and a pivotable bracket for facilitating the transition between a stowed and deployed positions. The stool may be mounted to an interior of a cabinet or may include a weighted base that is positionable within the interior of the cabinet. The stool may include a cantilevered design.

DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

DETAILED DESCRIPTION

Figure 1B:
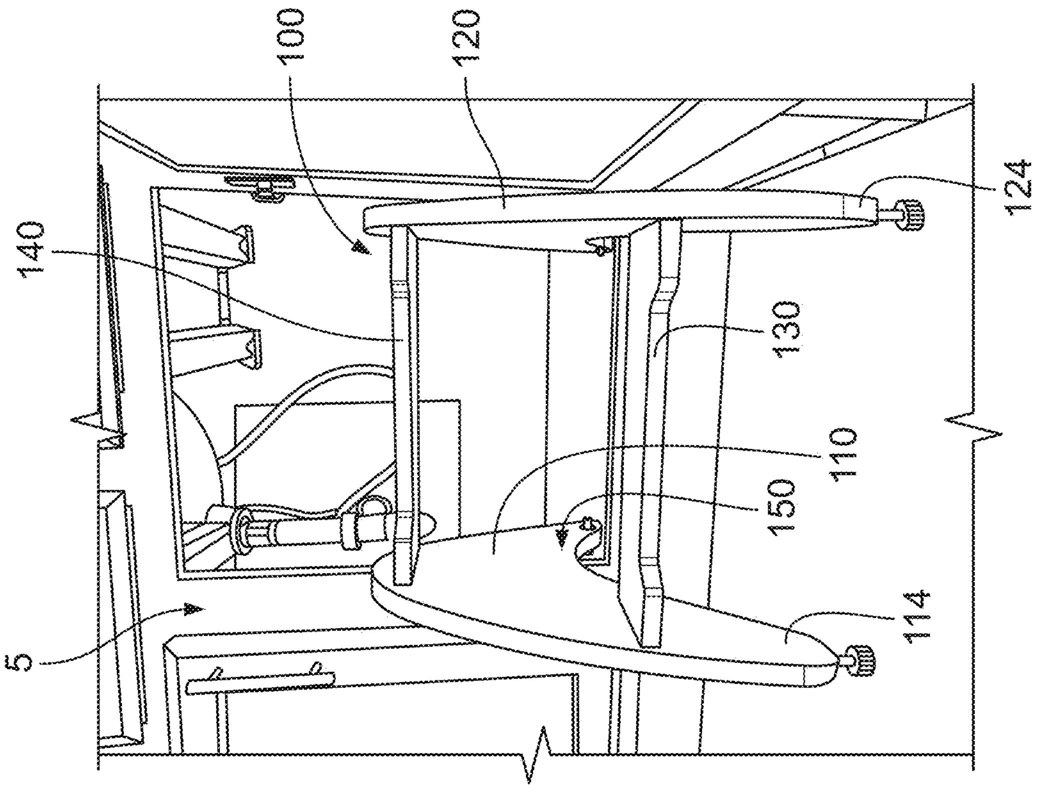
FIG. 1B is a perspective view of an embodiment of a stool mountable to an interior of a cabinet and in a deployed or in-use position in accordance with aspects disclosed herein.
Figure 1A:
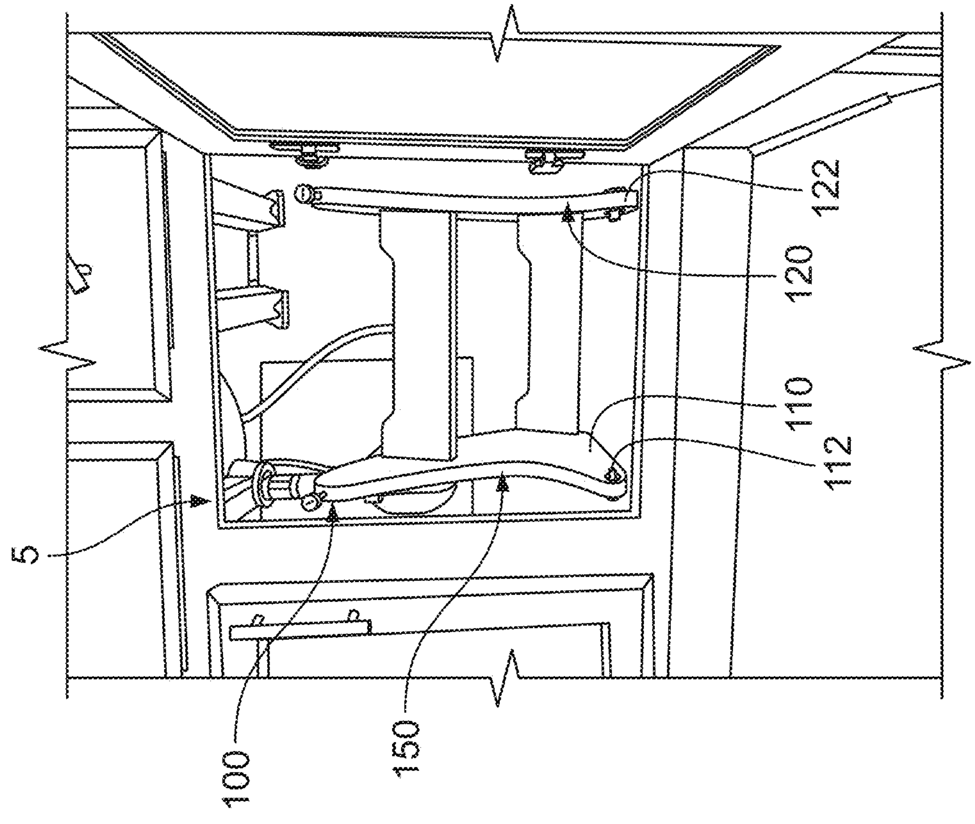
FIG. 1A is a perspective view of an embodiment of a stool mountable to an interior of a cabinet and in a stowed position in accordance with aspects disclosed herein.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is a stool or stoop device that is easily transitioned between a stowed position within a cabinet and a deployed or in-use position outside of a cabinet. The stool may have a streamlined design and high ease of use so that the stool may be stowed away, set up, and utilized by children, in an example. The stool can accommodate multiple cabinet designs, floor surfaces and under-cabinet structures, such as drain traps and plumbing. The stool may be flat-boxed shipped and easily installed into a cabinet structure with minimal tools or training. In an embodiment, the stool may comprise at least two legs, wherein each leg includes a concaved or recessed portion, at least one step between and connecting the at least two legs, and a pivotable bracket for facilitating the transition between a stowed and deployed positions. The stool may be mounted to an interior of a cabinet or may include a weighted base that is positionable within the interior of the cabinet. The stool may include a cantilevered design.

In an embodiment, the described stools may enable a child to independently deploy and stow a stoop from under the cabinet in a safe and efficient manner under adult supervision, avoid under-cabinet structures such as drain traps and plumbing, and/or function in harmony with the majority of cabinet designs. Generally, the stools may comprise one or more steps, or two or more steps, such that shorter users (such as children) can navigate the steps with relative ease. In an embodiment, the step height may make the stoop easily navigable by young children, especially those in the potty-training years and beyond, until they can reach the faucet independently. In particular, a first step may have a height of about 6.5" to 7" and a top step of between about 13" to 14". It should be understood that the dimensions provided are considered to include variations of at least 0.5".

In an embodiment, the described stools may not require or include lateral and vertical supports. The absence of lateral and vertical supports may allow the described stools to fit within the structure of a cabinet, such as a cabinet including plumbing and pipes. In an embodiment, the described stools do not require additional supports, including, without limitation, the lateral or vertical supports found in the prior art.

Turning to FIGS. 1-4, shown is a stool 100. The stool 100 may comprise a first side or leg 110 and a second side or leg 120. In an embodiment, the stool 100 includes at least two sides or legs 110, 120. It is noted that the stool 100 may include any number of legs, including one, two, three, four, or more legs. The legs 110, 120 may be generally the same size and shape. In an embodiment, the legs 110, 120 may be identical or nearly identical in size and shape. The legs 110, 120 may be substantially parallel (i.e., within 5 degrees of parallel) to each other. Each leg 110, 120 may include a first end 112, 122 and a second end 114, 124.

The first end 112, 122 of each leg 110, 120 may be selectively attachable to a cabinet 5. The second end 114, 124 of each leg 110, 120 may not attach to the cabinet 5 and may be selectively positionable inside of the cabinet 5 in a stowed position, shown in FIG. 1A and selectively positionable outside of the cabinet 5 in a deployed or in-use position, shown in FIG. 1B. The stool 100 may rotate or pivot about the first end 112, 122 of each leg 110, 120 to selectively transition between the stowed position shown in FIG. 1A and the deployed or in-use position shown in FIG. 1B. In both the stowed position shown in FIG. 1A and the deployed or in-use position shown in FIG. 1B, the first end 112, 122 may remain in the cabinet 5 (e.g., by mounting bracket 200 shown in FIGS. 6-7 or by weighted base 300 shown in FIG. 8). When selectively positioned in either the stowed position or the deployed position, both legs 110, 120 may be generally vertical or perpendicular to the cabinet 5 (e.g., a base 10 of the cabinet 5) and the floor.

When in a deployed position shown in FIG. 1B, the second ends 114, 124 of the legs 110, 120 may be placed at or near the floor in front of the cabinet 5. The second ends 114, 124 may include leg height inserts 250, see FIG. 5. The leg height inserts 250 may be individually adjustable in height. The leg height inserts 250 may attach to the second ends 114, 124 of the legs 110, 120 and may contact the floor when in a deployed position. The leg height inserts 250, in an example, may be threaded into the second ends 114, 124 of the legs 110, 120 and the twisting and untwisting of the leg height inserts 250 within a certain range may provide the adjustable higher and lower heights of each leg 110, 120 individually. The leg height inserts 250 may be used to provide stability and levelness to the stool 100 in a deployed position when, in an example, the floor may not be level. The leg height inserts 250 may allow the steps to be generally level (i.e., within 5 degrees of level).

Legs 110, 120 may generally include a concaved or recessed area 150, 155. For example, in an embodiment, leg 110 includes a concaved area 150 between the first end 112 and the second end 114. Legs 110, 120 may generally include an apex 160 165. For example, in an embodiment, leg 110 includes an apex 160 opposite the concaved area 150 between the first end 112 and the second end 114. Similarly, in an embodiment, leg 120 includes a concaved area 155 between the first end 122 and the second end 124 and, in an embodiment, leg 120 includes an apex 165 opposite the concaved area 155 between the first end 122 and the second end 124.

When viewed in a deployed position, the concaved area 150, 155 may generally be understood as being on a lower side or edge of the legs 110, 120 and the apex 160, 165 may generally be understood as being on an upper side or edge of the legs 110, 120. The concaved area 150, 160 may extend above or beyond both the first end 112, 122 and second end 114, 124, see FIG. 3 for example. The apex 160, 165 may extend above or beyond both the first end 112, 122 and second end 114, 124, see FIG. 3. In an embodiment, the concaved side 150, 160 may curve inward from the first end 112, 122 and second end 114, 124 of the corresponding legs 110, 120. In an embodiment, the apex side 160, 165 may curve outward from the first end 112, 122 and second end 114, 124 of the corresponding legs 110, 120.

Figure 5:
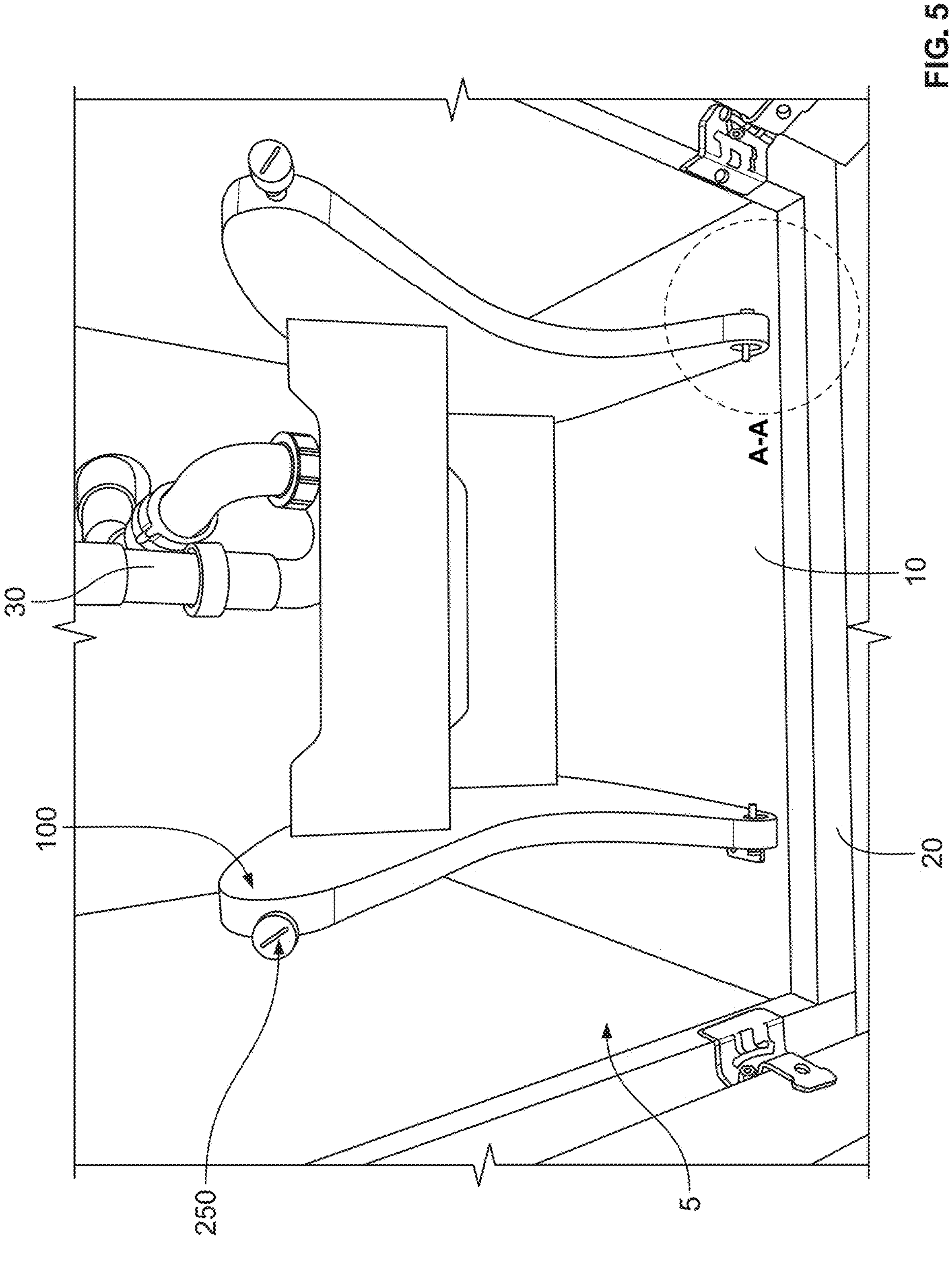
FIG. 5 is a perspective view of an embodiment of a stool mountable to an interior of a cabinet and in a stowed position in accordance with aspects disclosed herein.
Figure 6:
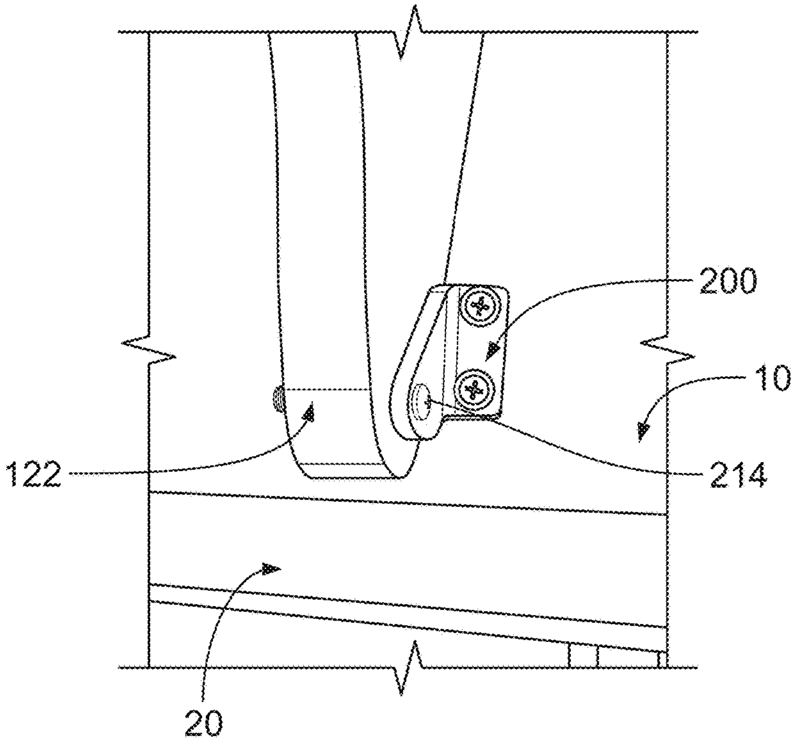
FIG. 6 is an enlarged view of an embodiment of a stool and mounting bracket shown as A-A in FIG. 5 in accordance with aspects disclosed herein.

The concaved area 150, 155, being higher or more inward than the first end 112, 122 of the legs 110, 120, may be able to accommodate different height variances of the cabinets 5. For example, as shown in FIGS. 1, 5 and 6, the cabinet 5 may include a base 10 and an edge 20. The base 10 may be generally flat or horizontal and the stool 100 may be positioned on or mounted to the base 10 of the cabinet 5. The stool 100, when in a deployed position, may have to extend over the edge 20. The edge 20 may include a molding and may vary in height between different cabinets, etc. The concaved area 150, 155 may provide clearance over these various edge 20 or cabinet 5 heights while remaining attached to or safely positioned on the base 10 of the cabinet and deployed onto the floor in front of the cabinet 5. In an embodiment, the stool 100 and legs 110, 120 thereof only contacts the base 10 of the cabinet 5 and does not contact the edge 20 of the cabinet 5 in any of the stowed or deployed positions. Contact points of the stool 100 only on the base 10 of the cabinet 5 and selectively on the floor when in a deployed position, can provide stability and security of the stool when weight is applied thereon with a minimized risk of wobbling, falling, tipping, and the like. Either or both of the legs 110, 120 may include corresponding concaved areas 150, 155. In an embodiment, the concaved areas 150, 160 may be the same. In an embodiment, the concaved areas 150, 155 may be different.

The stool 100 may further comprise at least one step 130. In an embodiment, the stool 100 may include at least two steps 130, 140. It is noted that the stool 100 may include any number of steps, including one, two, three, four, five, six, seven, or more steps. The steps 130, 140 may be generally the same size and shape. In an embodiment, the steps 130, 140 may be identical or nearly identical in size and shape. The steps 130, 140 may be substantially parallel to each other (i.e., within 5 degrees of being parallel). Each step 130, 140 may include a first end 132, 142 and a second end 134, 144

Each step 130, 140, may be positioned between and connect the at least two legs 110, 120. The steps 130, 140 may be positioned between and connect the at least two legs 110, 120 at graduated positions, e.g., to provide elevating or descending steps. The first step 130 (which also may be referred to as the lower step as viewed when in a deployed position) may connect to the first leg 110 at its first end 132 and the second end 134 of the first step 130 may connect to the second leg 120. Similarly, the second step 140 (which also may be referred to as the upper step as viewed when in a deployed position) may connect to the first leg 110 at its first end 142 and the second end 144 of the second step 140 may connect to the second leg 120. The steps 130, 140 may be generally perpendicular to the legs 110, 120.

In an embodiment, the first end 132 of the first step 130 may attach to the first leg 110 at a point 116 and the second end 134 of the first step 130 may attach to the second leg 120 at a point 126. In an embodiment, the first end 142 of the second step 140 may attach to the first leg 110 at a point 118 and the second end 144 of the second step 140 may attach to the second leg 120 at a point 128. Each of the points or areas 116, 118, 126, 128, on the legs 110, 120 may comprise mating portions configured to receive the corresponding ends 132, 134, 142, 144 of the steps 130, 140.

Figure 2:
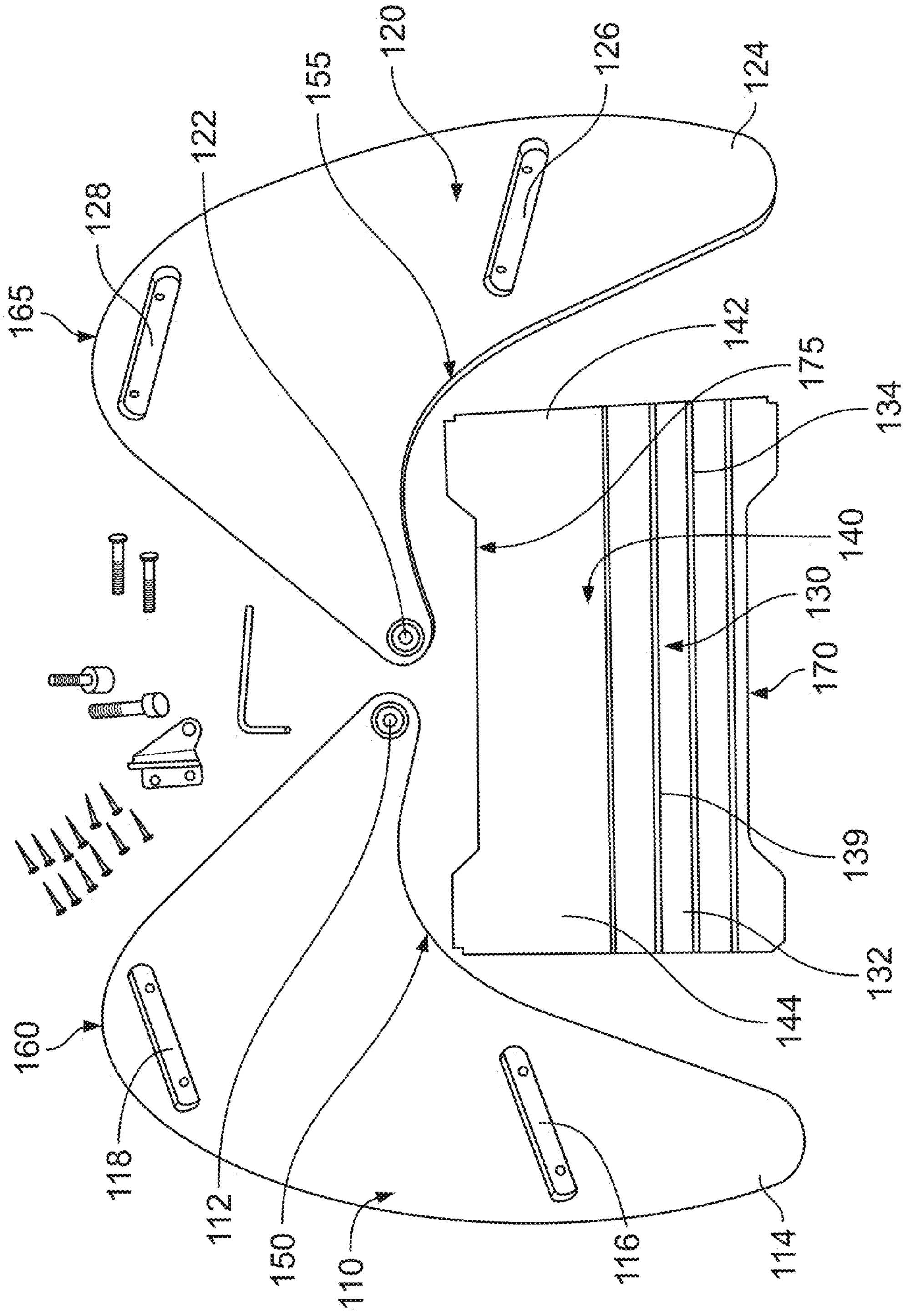
FIG. 2 is an exploded view of an embodiment of a stool mountable to an interior of a cabinet and showing an embodiment of disassembled fasteners and components in accordance with aspects disclosed herein.
Figure 9:
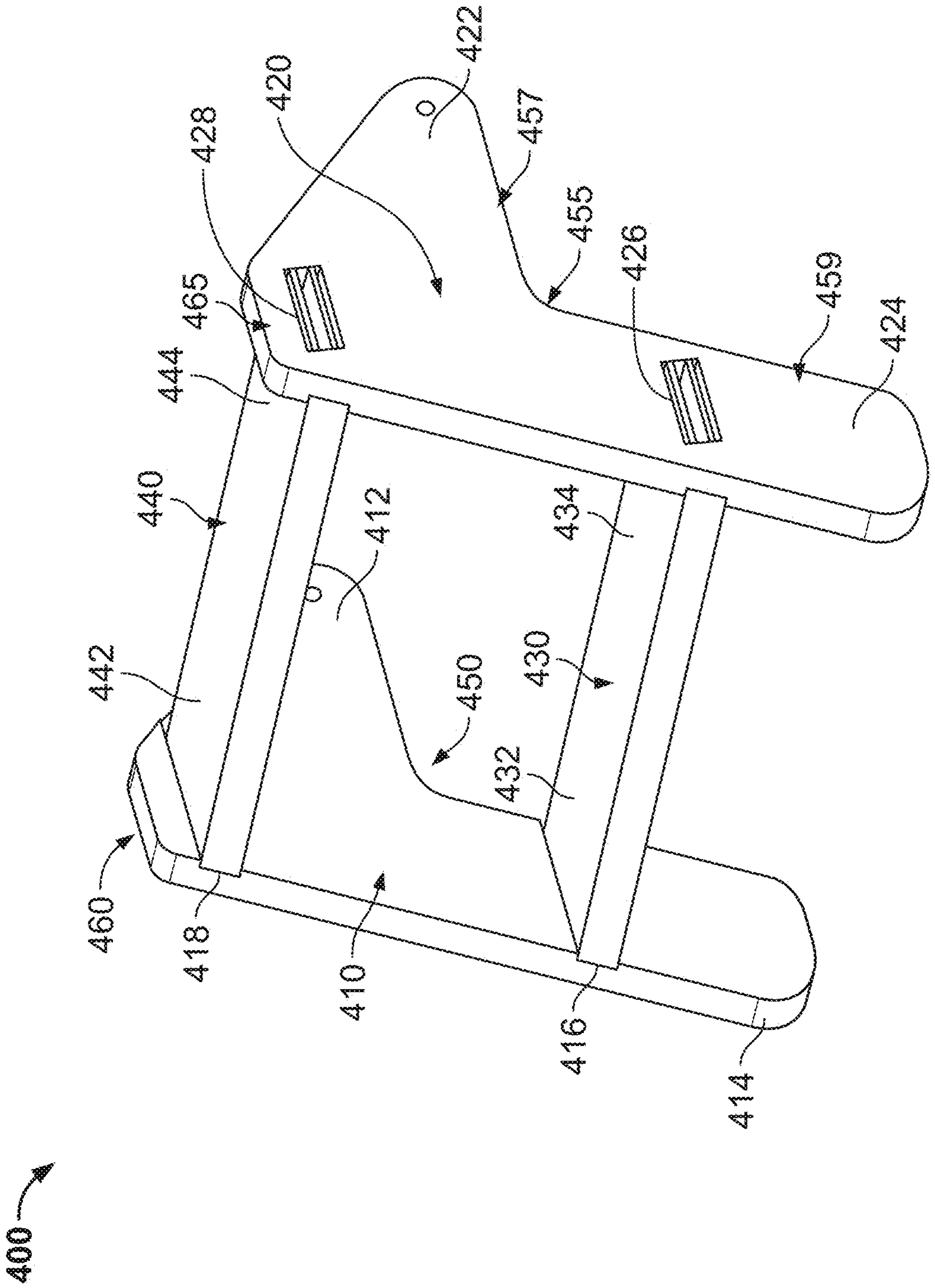
FIG. 9 is a perspective view of an embodiment of a stool positionable within an interior of a cabinet in accordance with aspects disclosed herein.

As shown in FIG. 2, the points or areas 116, 118, 126, 128 may be recessed. As shown in FIGS. 9 (and 10), the points or areas 416, 418, 426, 428 may extend through the entire face of the legs 410, 420, e.g., so that the ends 432, 434, 442, 444 of the steps 430, 440 extend through the legs 410, 420 at these points or areas 416, 418, 426, 428 of attachment. The steps 130, 140 may attach to these points or areas 116, 118, 126, 128 of attachment on the leg 110, 120 by any desired engagement, including friction fit, snap fit, pressure fit, adhesives, or fasteners such as nails or screws. It is also noted that the legs 110, 120 may instead include a continuous surface and that the steps 130, 140 may be attached thereto (at the points or areas 116, 118, 126, 128) by adhesives or fasteners such as nails or screws.

In an embodiment, connection area 118 may generally be positioned toward the apex 160 of the first leg 110. In an embodiment, connection area 128 may generally be positioned toward the apex 165 of the second leg 120. The connection area 118, 128 at the corresponding apexes 160, 165 of each leg 110, 120 may allow for maximum height of the step (e.g. upper step 140) while minimizing the height of the legs 110, 120 or coordinating the height of the highest step (e.g. upper step 140) to the height of the legs 110, 120. Such apex height step may allow for a smaller profile of the stool 100 while still providing a stool function to increase height or reach of the user.

Figure 3:
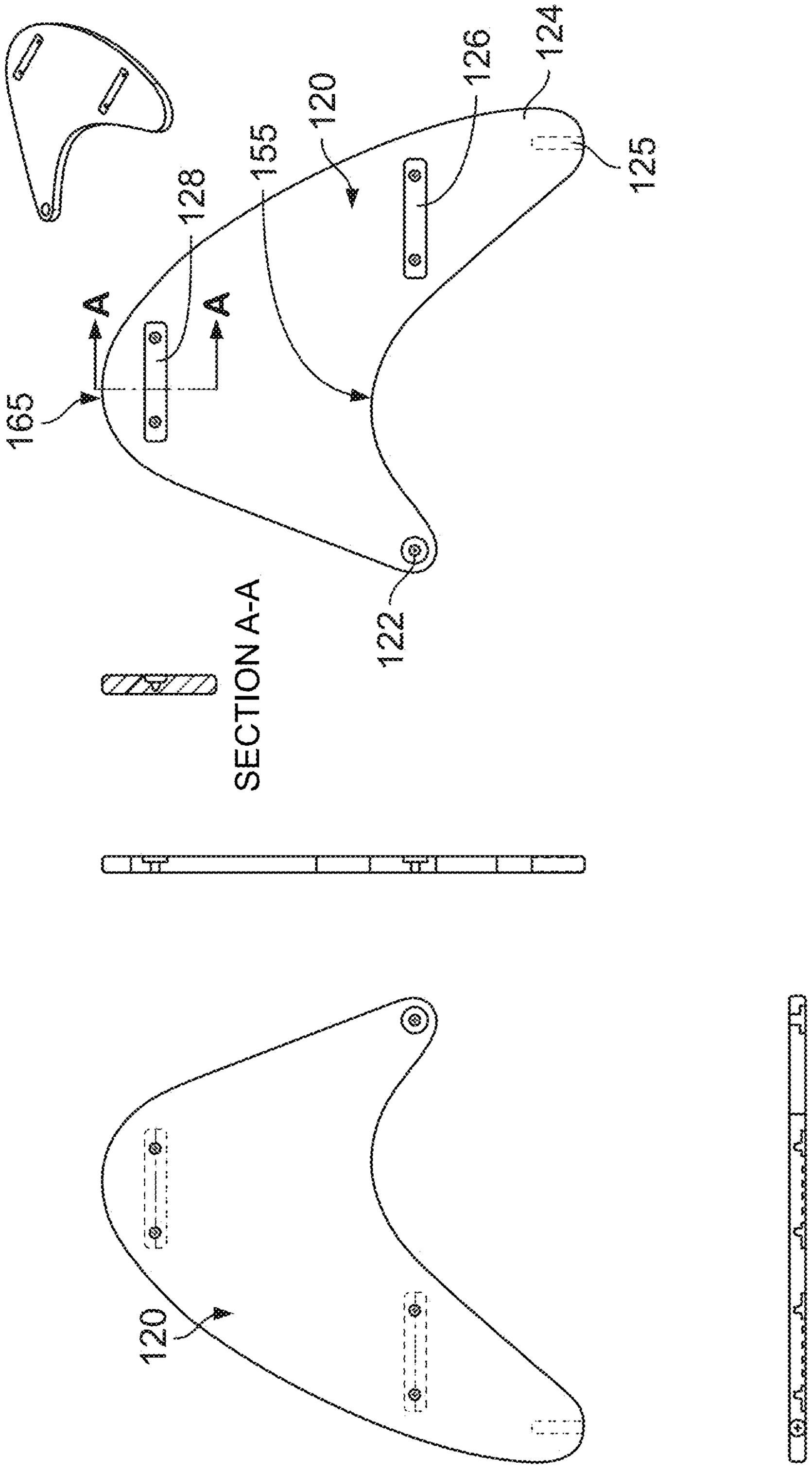
FIG. 3 is a side view of an embodiment of a leg of a stool in accordance with aspects disclosed herein.

In an embodiment, connection area 116 may generally be aligned with the first end 112 of the first leg 110, see FIGS. 2 and 3. In an embodiment, connection area 116 may generally be horizontally aligned with the first end 112 of the first leg 110 across from the concaved area 150, see FIGS. 2 and 3. In an embodiment, connection area 126 may generally be aligned with the first end 122 of the second leg 120, see FIGS. 2 and 3. In an embodiment, connection area 126 may generally be horizontally aligned with the first end 122 of the second leg 120 across from the concaved area 155, see FIGS. 2 and 3. The alignment of the first ends 112, 122 and the connection areas 116, 126 may allow for increased leg, stability, and weight distribution of the stool 100 when in use.

Figure 4:
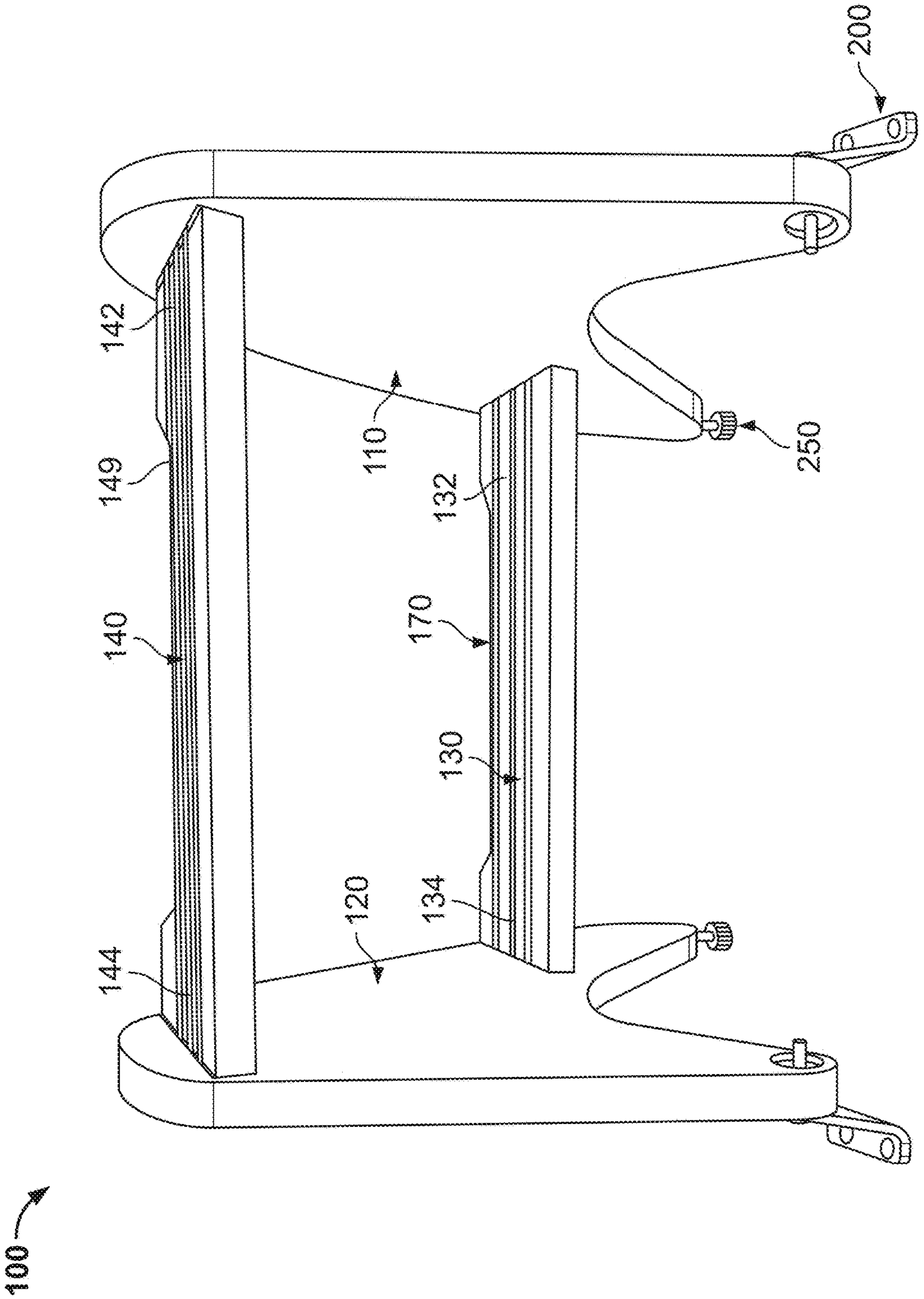
FIG. 4 is a back view of an embodiment of a stool mountable to an interior of a cabinet (and not installed) in accordance with aspects disclosed herein.

Steps 130, 140 may include a chamfer, recessed area or cut-out 170, 175. For example, in an embodiment, step 130 includes a recessed area 170 between the first end 132 and the second end 134. Similarly, in an embodiment, step 140 includes a recessed area 175 between the first end 142 and the second end 144. When viewed in a deployed position, the recessed area 170, 175 may generally be understood as being on a front side or edge of the steps 130, 140, see FIG. 1B showing a front view of stool 100 and FIG. 4 showing a back view of stool 100. When viewed in a stowed position, the recessed area 170, 175 (and stool 100) may rotate between approximately 90° to 180° (i.e., within 5 degrees of such) and may face a top or back of the cabinet 5, namely where pipes 30 may be located in an under-the-sink cabinet, see FIGS. 5 and 8.

The recessed area 170, 175 may be inset from both the first end 132, 142 and second end 134, 144, see FIG. 3 for example. In an embodiment, the recessed side 170, 175 may curve inward from the first end 132, 142 and second end 134, 144 of the corresponding steps 130, 140. The recessed area 170, 175 being more inward than the first end 132, 142 and second end 134, 144 of the steps 130, 140, may be able to accommodate different pipe 30 configurations within the cabinets 5. The stool 100, when in a stowed position, may have to be positioned near or next to pipes 30 within the cabinet 30. The recessed area 170, 175 may provide clearance over these various pipe 30 configurations while remaining properly stowed within the confines of the cabinet 5. Either or both of the steps 130, 140 may include corresponding recessed areas 170, 175. In an embodiment, the recessed areas 170, 175 may be the same. In an embodiment, the recessed areas 170, 175 may be different. Unlike a cabinet edge 20 which may be the same across and thus the corresponding concaved areas 150, 160 may be generally the same between legs 110, 120, the pipes 30 may be offset to one side in the cabinet 5 or may only affect the steps that are closest to it in a stowed position, e.g., second step 140 shown in FIG. 5.

In am embodiment the steps 130, 140 may further include a top surface feature 139, 149 on the steps 130, 140. The surface feature 139, 149 may be located on the top surface of the steps 130, 140 that are stepped on during use. The surface feature 139, 149 may provide increased traction or gripping during use (compared to a smooth continuous surface which may be slippery) and may be any appropriate shape or size, including inset lines (see FIG. 4 for example), protruding lines, dotted patterns that are inset or protruding, or any other patterning as appropriate. The surface feature 139, 149 may be part of the material of the stool (e.g., grooves or carvings in wood, plastic metal, etc.) or may be a separate element attachable to the steps 130, 140 (e.g., rubberized matts with a surface pattern, etc.).

In an embodiment, stool 100 may include at least two mounting brackets 200, generally shown in FIGS. 1 and 4-7. In this embodiment, the stool 100 may selectively attach directly to the cabinet 5 (e.g., to the base 10 of the cabinet 5). In an embodiment, stool 100 may include a weighted base 300 selectively positionable in the cabinet 5 (e.g., on the base 10 of the cabinet 5), generally shown in FIG. 8. In this embodiment, the weight of the weighted base, or the use of an adhesive (such as an adhesive that can be removed without damage to the surface to which it was adhered), for example, may position and fix the stool 100 within the cabinet 5, without causing damage or actually traversing through the surface of the cabinet 5, such as by a fasteners like screw or nail used with the mounting brackets 200. In both embodiments, the stool 100 may be rotatable about the mounting bracket 200 or about the weighted base 300 between stowed and deployed positions. The fixing of the stool 100 by the mounting brackets 200 or the weighted base 300 may provide stability and security of the stool 100 when in use and may provide simple transition between the stowed and deployed positions. In both embodiments stool 100 may include any combination of or all of the features as described herein, the only difference being the fixing of the stool 100 to the cabinet 5.

Figure 7:
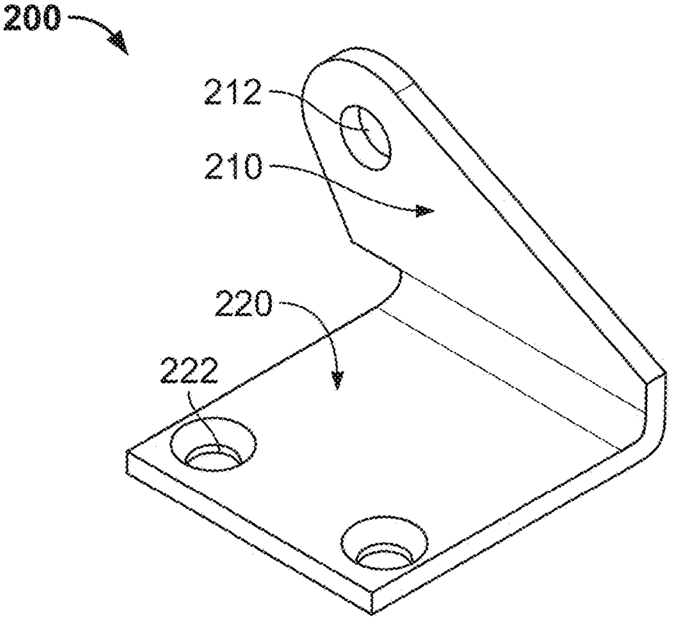
FIG. 7 is a perspective view of an embodiment of a mounting bracket in accordance with aspects disclosed herein.

Turning to FIG. 6, shown is a mounting bracket 200 as attached to the stool 100 and to the cabinet 5. FIG. 7 shows the mounting bracket 200 separately. In an embodiment, the mounting bracket 200 may include a first face 210 and a second face 220. In an embodiment, the first face 210 and the second face 220 may be approximately perpendicular or 90° apart, such as between approximately 80° to 100°, 85° to 95°, 88° to 92°, 90°, or the like. The first face 210 of the mounting bracket 200 may be selectively attachable to the first end 112, 122 of the legs 110, 120. The second face 220 of the mounting bracket 200 may be selectively attachable to the base 10 of the cabinet 5. The mounting bracket 200 may include one or more apertures 212, 222 per face 210, 220 for attachment to the corresponding portion of the stool 100 or cabinet 5. For example, the first face 210 of the mounting bracket 200 may include one aperture 212 for attachment to the first end 112 of the leg 110 or the first end 122 of the leg 120. This attachment between the mounting bracket 200 and the stool 100 may be a rotatable attachment to allow the stool 100 to rotate between stowed and deployed positions about this attachment. The second face 220 of the mounting bracket 200 may include two apertures 222 for attachment to the base 10 of the cabinet 5. This attachment between the mounting bracket 200 and the cabinet 5 may be a fixed attachment to secure the stool 100 to the cabinet 5. In an embodiment, the attachment to the base 10 of the cabinet 5 may be near or adjacent to the edge 20 of the cabinet 5.

As noted, the attachment between the mounting bracket 200 and the stool 100, through the first face 210 and aperture 212, may be a rotatable attachment to allow the stool 100 to rotate between stowed and deployed positions about this attachment. In an embodiment, the rotatable attachment may be effectuated by a hinge bolt 214 that is inserted through the aperture 212 on the first face 210 of the mounting bracket 200 and through the first end 112, 122 of the first or second leg 110, 120. In an embodiment, the hinge bolt 214 may extend through the entire width of the leg 110, 120 and be fastened on the exposed side, e.g., by a washer or the like.

As noted, the attachment between the mounting bracket 200 and the cabinet 5, through the second face 220 and one or more apertures 222, may be a fixed attachment to secure the stool 100 to the cabinet 5. In an embodiment, the fixed attachment may be effectuated by a fastener, such as nails or screws, which are inserted through the aperture 222 on the second face 220 of the mounting bracket 200 and through the base 10 of the cabinet 5.

The second face 220 of the mounting bracket 200 may include any number of apertures 222 to secure the mounting bracket 200 (and thereby the stool 100) to the cabinet 5, including one, two, three, four, five etc. apertures. The first face 210 of the mounting bracket 200 may also include any number of apertures 212 to secure to the mounting bracket 200 to the stool 100 and/or to provide rotation, including one, two, three, four, five etc. apertures. In an embodiment, the first face 210 of the mounting bracket 200 includes one aperture for rotatable attachment with, for example, a hinge bolt 214 and either zero, or one or more apertures for fixed attachment of the mounting bracket 200 to the stool 100 by, for example, a screw, nail or the like.

As shown in FIGS. 4-5, the mounting brackets 200 may be positioned on the outer sides of the legs 110, 120. It is also noted that the mounting brackets 200 may be positioned on the inner sides of the legs 110, 120.

Figure 8:
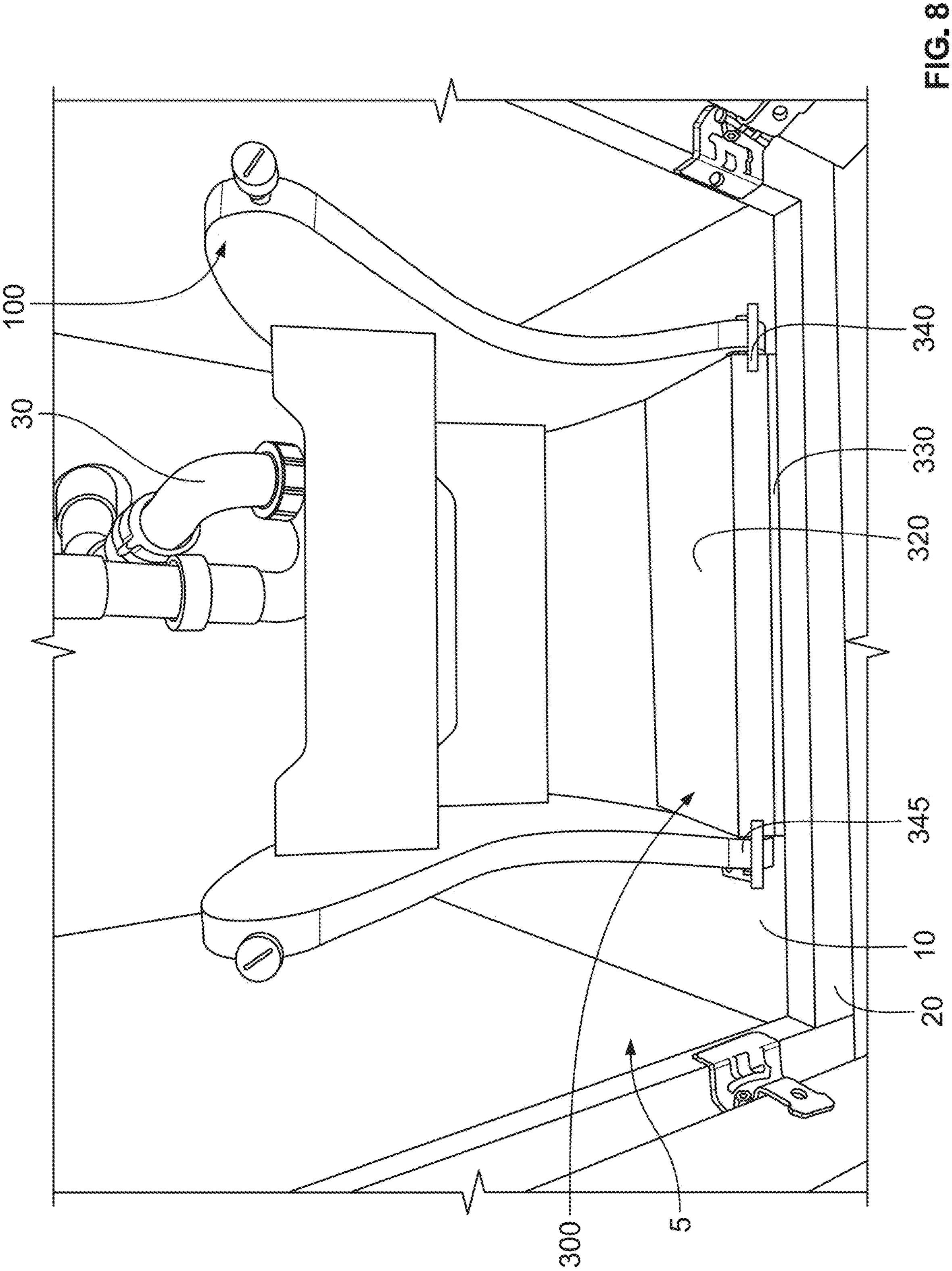
FIG. 8 is a perspective view of an embodiment of a stool having a weighted base and in a stowed position in accordance with aspects disclosed herein.

Turning to FIG. 8, shown is a weighted base 300 as attached to the stool 100 and positioned in the cabinet 5. In an embodiment, the weight base 300 may extend between the first leg 110 and the second leg 120 of the stool 100. The weighted base 300 may comprise a weighted portion 320, an optional non-slip or adhesive layer 330, and pivot points 340 that insert into the first and the second legs 110, 120 and provide rotation of the stool 100 to transition between stowed and deployed positions. The weighted base 300 may be any appropriate weight including, for example, between 1-60 lbs., to offset the weight of a user when stepping on the stool 100 in a deployed position. In an embodiment, the weight of the weighted base may be from 2 to 8 lbs., from 4 to 6 lbs., etc. The weighted base 300 may be any appropriate dimensions, including, for example, a width less than the opening for the cabinet 5, a width less than the distance between legs 110, 120, a height between 0.5 to 15 inches, etc. In an embodiment, the weighted base 300 may have a width approximately the width of the steps (e.g., steps 130, 140). In an embodiment, the height of the weighted base 300 may be at least two times the distance from the cabinet base 10 to the pivot points 340 or the apertures in the legs 110, 120 configured to receive the pivot points 340. The weighted base 300 may be any appropriate material, including dense materials such as cast iron, or the weight of the weighted base 300 may be created by the user, for example, the weighted base 300 may include a vessel, container, or bladder that the user can will with readily available materials such as a liquid (e.g., water), sand, or the like, to provide the weight for the weighted base 300. The weighted base 300 may be substantially flat and be able to remain in generally the same position in the cabinet 5 even when the stool is transitioned between stowed and deployed positions and when the stool 100 is in use by a user.

In embodiments including the non-slip or adhesive layer 340, the non-slip or adhesive layer 340 may be positioned under the weighted portion 320 between the weighted portion 320 and the base 10 of the cabinet 5. The non-slip or adhesive layer 340 may extend under the entire surface of the weighted portion 320 or the non-slip or adhesive layer 340 may extend under only portions of the weighted portion 320. The non-slip or adhesive layer 340 may be continuous, non-continuous, patterned, removable, or the like. In an embodiment, the adhesive may be a non-permanent or reversible adhesive so that the weighted base 300 and stool 100 may be selectively removed form the cabinet 5 without leaving damage that would be evident if screws, nails, or the like were used.

The pivot points 340 that insert into the first and the second legs 110, 120 from the weighted base 300 and provide rotation of the stool 100 may be similar to the apertures 212 on the first face of the mounting bracket 200 and the hinge bolts 214 as described. For example, the pivot points 340 may include elongated bolts 345 that extend from opposite sides of the weighted base 300 and are selectively attachable through the first end 112 of the first leg 110 and the second end 122 of the second leg 120. In an embodiment, the elongated bolts 345 may extend through the entire width of the leg 110, 120 and be fastened on the exposed side, e.g., by a washer or the like.

It is noted that the general design of the weighted base 300 as a base, including dimensions position, components, etc., may provide another option to attach the stool (e.g., stool 100, 400, 500) to the cabinet 5. In an embodiment, the base may include a weighted component as in the case of weighted base 300, or may not include a specific weighted component and may serve as an attachment, non-weighted base. In an embodiment, the base may be attached to the cabinet base 10 with fasteners, including fasteners described herein such as screws, nails, etc. In an embodiment, the base may attach to the stool (e.g., stool 100, 400, 500) in the same manner as described for the weighted base 300 and may be used in lieu of mounting brackets (e.g., mounting bracket 200, 600) or mounting brackets (e.g., mounting bracket 200, 600) may be used to attach the stool (e.g., stool 100, 400, 500) to the base, and the base may be attached to the cabinet base 10. In an example, a piece of wood, concrete, plastic, metal, or the like, having the same dimensions as the weighted base 300, for example, may be affixed to the cabinet base with fasteners, but not include the additional weighted portion of the weighted base 300.

Figure 10:
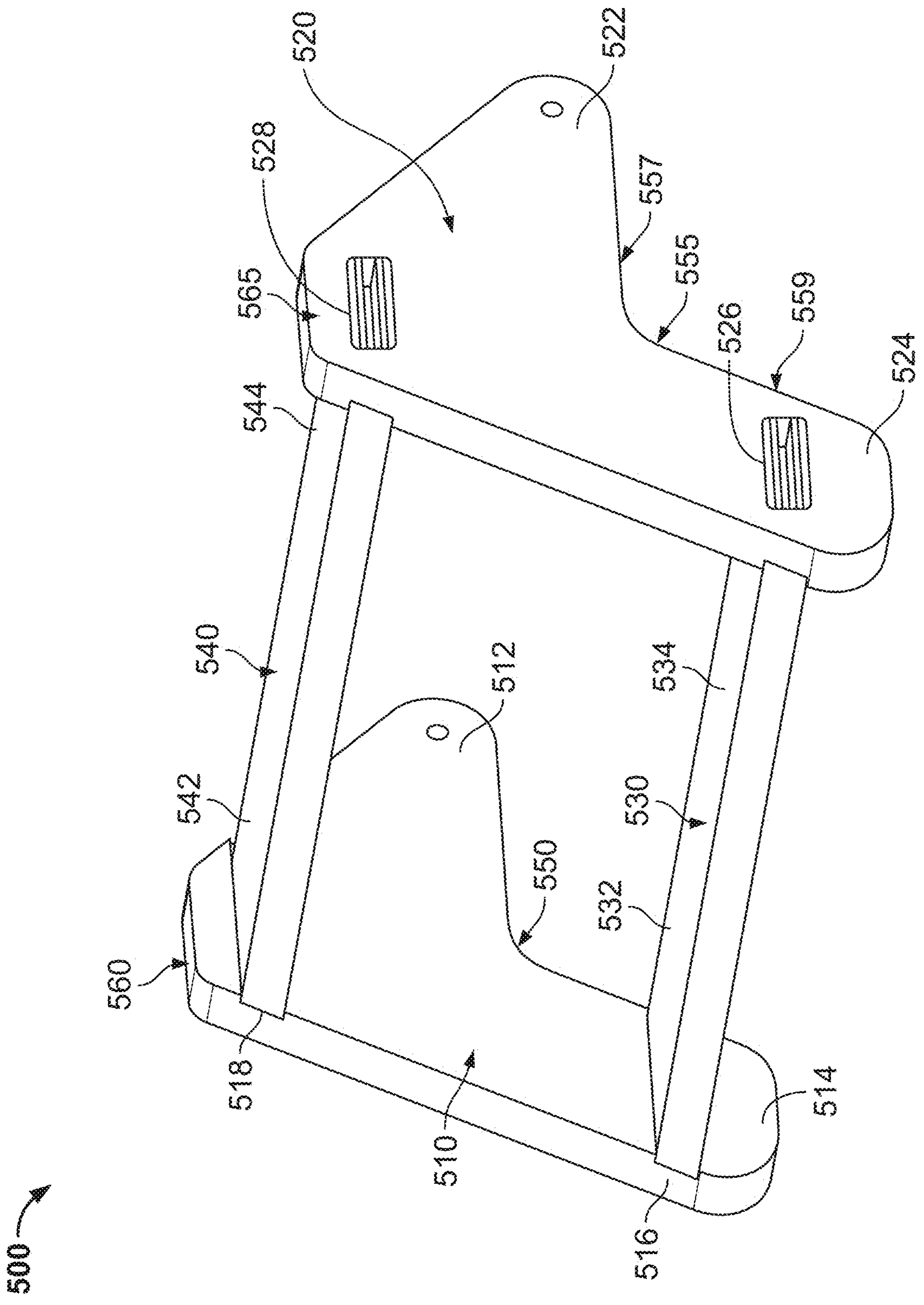
FIG. 10 is a perspective view of an embodiment of a stool positionable within an interior of a cabinet in accordance with aspects disclosed herein.

Turning to FIGS. 9-10 shown are stools 400, 500. Stools 400, 500 may include any combination of or all of the features as described herein related to stool 100, mounting bracket 200, and/or weighted base 300. For example, stool 400 may include at least two legs 410, 420 and at least one step 430, 440 between and connecting the two legs 410, 420. The steps 430, 440 may be substantially perpendicular to the legs 410, 420. The legs 410, 420 may be substantially perpendicular to the cabinet base 10 and/or floor in at least the deployed and the steps 430, 440 may be parallel to the cabinet base 10 and/or floor at least in the deployed position.

The legs 410, 420 may each include corresponding first ends 412, 422 that are configured to be attached or fixed to a cabinet 5, such as the base 10 of the cabinet 5, by the mounting bracket 200 or the weighted base 300. The mounting bracket 200 or the weighted base 300 may provide rotation of the stool 400 between a stowed and deployed position as described in reference to stool 100. The legs 410, 420 may each further include corresponding second ends 414, 424 that are configured to sit in front of or on the floor in a deployed position. As described in reference to stool 100, the second ends 414, 424 may include leg height inserts 250 where the leg height inserts 250 may be individually adjustable in height and may be selectively threaded into the second ends 414, 424 of the legs 410, 420. The leg height inserts 250 may contact the floor in a deployed position and the twisting and untwisting of the leg height inserts 250 within a certain range may provide adjustable higher and lower heights of each leg 410, 420 individually.

As described herein, the steps 430, 440 may attach to the legs 410, 420 at certain points or areas 416, 418, 426, 428 and the points or areas 416, 418, 426, 428 may extend through the entire face of the legs 410, 420, e.g., so that the ends 432, 434, 442, 444 of the steps 430, 440 extend through the legs 410, 420 at these points or areas 416, 418, 426, 428 of attachment. It is noted that the points or areas may alternatively be recessed, as in regard to stool 100 and legs 110 and 120 shown in FIG. 2 or flush.

Turning to stool 500, stool 500 may include at least two legs 510, 520 and at least one step 530, 540 between and connecting the two legs 510, 520. The steps 530, 540 may be substantially perpendicular to the legs 510, 520. The legs 510, 520 may be substantially perpendicular to the cabinet base 10 and/or floor in at least the deployed and the steps 530, 540 may be parallel to the cabinet base 10 and/or floor at least in the deployed position.

The legs 510, 520 may each include corresponding first ends 512, 522 that are configured to attached or fixed to a cabinet 5, such as the base 10 of the cabinet 5, by the mounting bracket 200 or the weighted base 300. The mounting bracket 200 or the weighted base 300 may provide rotation of the stool 500 between a stowed and deployed position as described in reference to stool 100. The legs 510, 520 may each further include corresponding second ends 514, 524 that are configured to sit in front of or on the floor in a deployed position. As described in reference to stool 100, the second ends 514, 524 may include leg height inserts 250 where the leg height inserts 250 may be individually adjustable in height and may be selectively threaded into the second ends 514, 524 of the legs 510, 520. The leg height inserts 250 may contact the floor in a deployed position and the twisting and untwisting of the leg height inserts 250 within a certain range may provide adjustable higher and lower heights of each leg 510, 520 individually.

As described herein, the steps 530, 540 may attach to the legs 510, 520 at certain points or areas 516, 518, 526, 528 and the points or areas 516, 518, 526, 528 may extend through the entire face of the legs 510, 520, e.g., so that the ends 532, 534, 542, 544 of the steps 530, 540 extend through the legs 510, 520 at these points or areas 516, 518, 526, 528 of attachment. It is noted that the points or areas may alternatively be recessed, as in regard to stool 100 and legs 110 and 120 shown in FIG. 2 or flush.

Similar to stool 100, each leg 410, 420 of stool 400 may include a concave portion 450, 455 and an apex 460, 465. Similarly, each leg 510, 520 of stool 500 may include a concave portion 550, 555 and an apex 560, 565. Unlike stool 100, stools 400, 500 may include a planar or straight portion. For example, the second leg 420 of stool 400 may include planar or straight portion 457 extending from the concave portion 455 toward the first end 422 of the leg 420. The first leg 410 of stool 400 and both legs 510, 520 of stool 500 may have the same planar or straight portion 557 extending from the concave portion 555 to the first end that attaches to the cabinet 5. When in a deployed position, the straight portion (e.g. 457, 557) may be substantially parallel to the floor and may rest on the base 10 and edge 20 of the cabinet 5.

Figure 11:
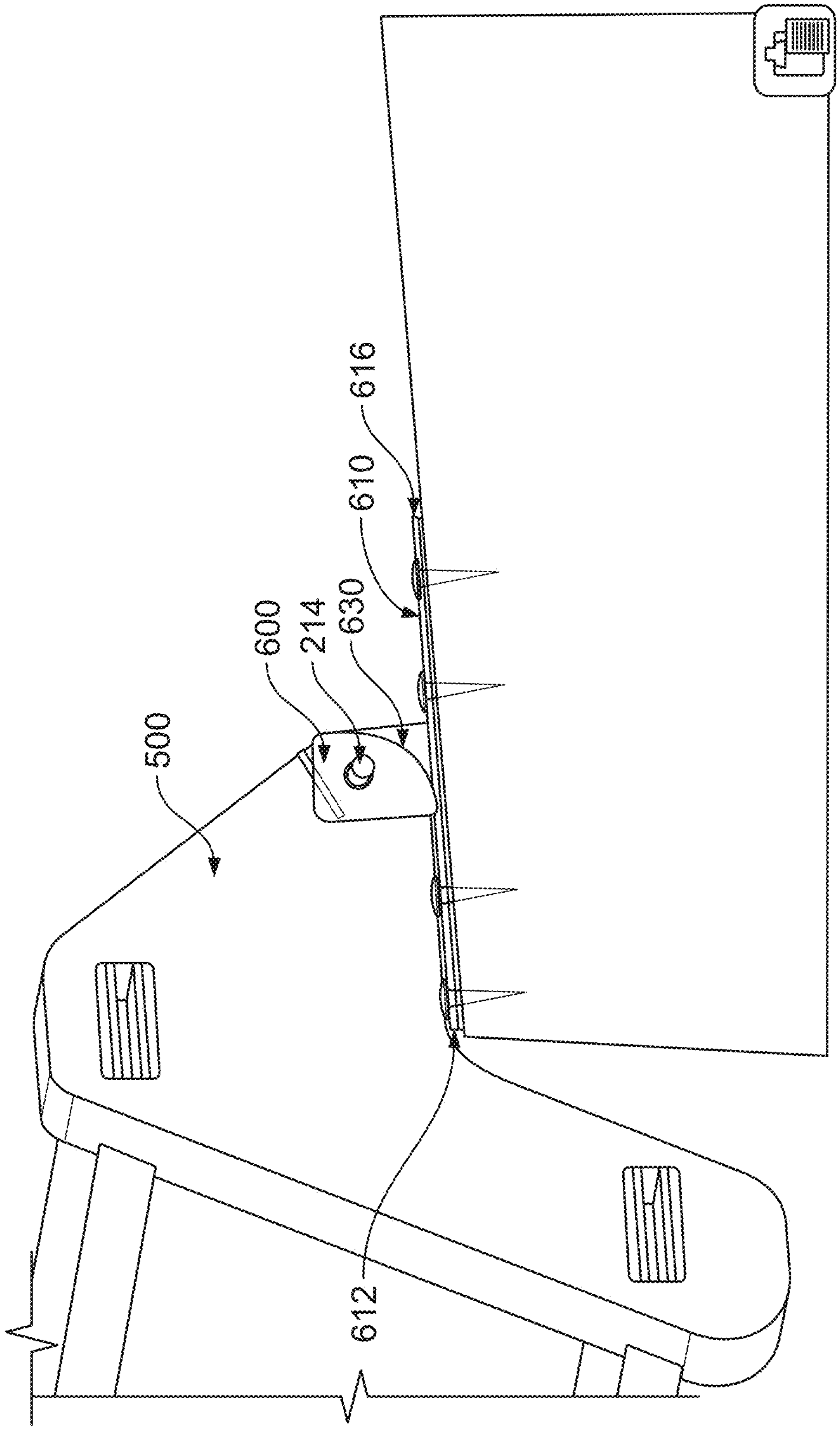
FIG. 11 is a perspective view of an embodiment of a stool and bracket in accordance with aspects disclosed herein and FIG. 12 is a perspective view of an embodiment of a bracket in accordance with aspects disclosed herein.
Figure 12:
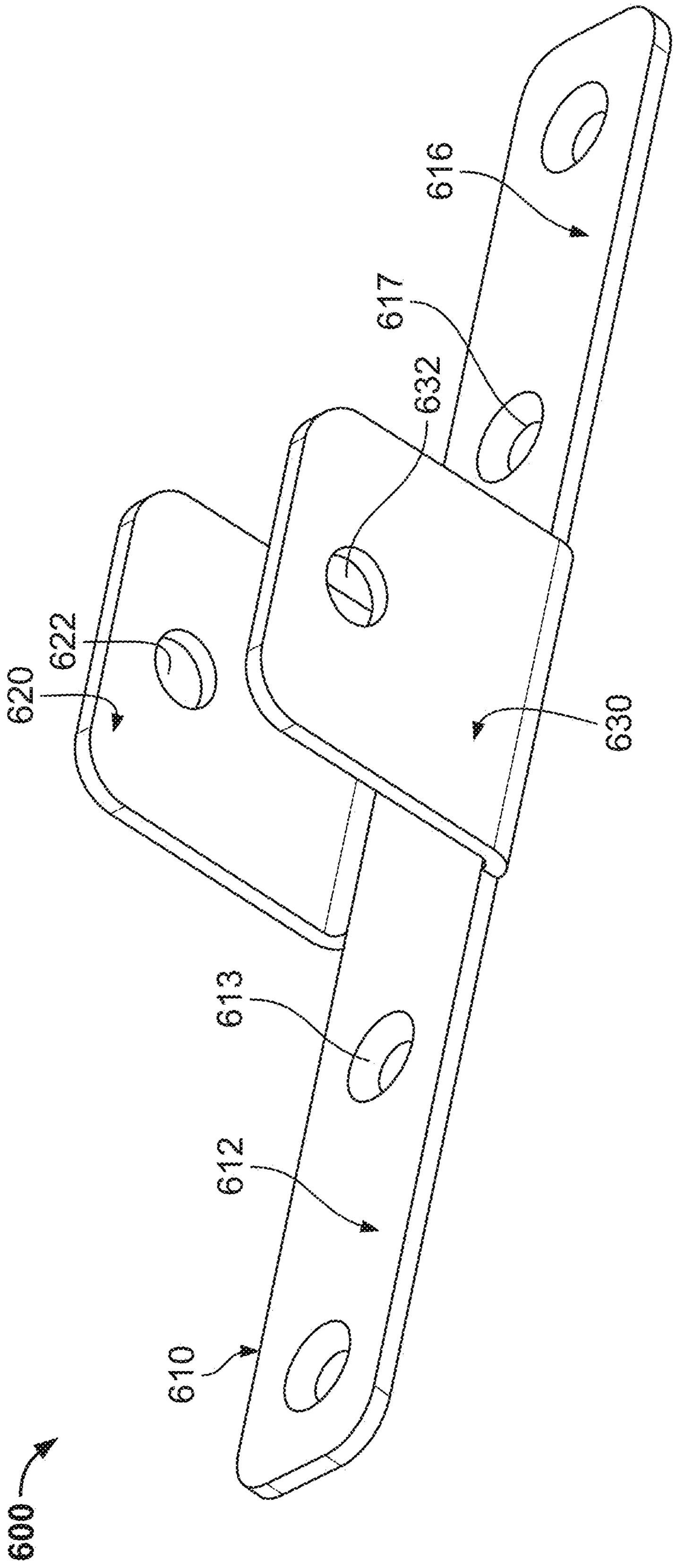

Stool 500 may further include a cantilevered design where the legs 510, 520 do not descend to the floor and do not include an extended leg or angled portion described in reference to stool 400 (e.g., angled portion 459). As shown in FIG. 10, for example, the legs 510, 520 extend minimally below the first step 530 in stool 500 (e.g., 0.5 inches to 3 inches) so for example to ensure that there is ample material under the stool 500 to secure it to the legs 510, 520. The cantilevered design may allow weight bearing to occur on the cabinet base 10 through a bracket (e.g. bracket 600 shown in FIGS. 11-12) rather than on the floor. For example, FIG. 12 shows bracket 600 having an elongated portion 610 and at least two perpendicular arms 620, 630. The two perpendicular arms may be positioned generally in the middle of the elongated portion 610 and include an aperture 622, 632. The elongated portion 610 may include at least one aperture 613, 617 configured to receive a fastener on each side 612, 616 of the elongated portion 610 (e.g., split by the position of the perpendicular arms 620,630). When stool 500 is mounted to the cabinet base 10 with bracket 600 and in a deployed position, the fasteners nearest the front of the cabinet 5 (e.g., on side 612 of the elongated portion 610 for example) may be compressed by the weight of the stool 500 and user. The fasteners furthest back in the cabinet 5 (e.g. on side 616 of the elongated portion 610 for example) may serve to minimize rotational forces by providing a vector in the opposing direction of the levered weight beyond the pivot point. Regarding attachment of the stool 500 to the bracket 600, leg 520, for example, may insert between the two arms 620, 630 and a hinge bolt (such as hinge bolt 214) may be inserted through the apertures 622, 632 on each arm 620, 630 to provide rotation of the stool 500. Leg 510 may insert into a second bracket.

As shown in FIG. 9, for example, each leg 410, 420 of stool 400 may further include an angled portion. For example the second leg 420 of stool 400 may include extended leg or angled portion 459 extending from the concave portion 455 toward the second end 424 of the leg 420 and extending passed the first step 430 to the floor. The first leg 410 of stool 400 may have the same angled portions extending from the concave portion to the second end that is selectively positionable on the ground. As shown in FIGS. 9-10, the angled portion 459 in stool 400 may be longer than the angled portion 559 in stool 500.

The stools 100, 400, 500 may be made of a desired material, including, without limitation, wood, metal, plastics, rubbers, concrete, composites, other natural materials including bamboo, and the like. As shown in FIG. 2 for stool 100, the stools 100, 400, 500 may be provided to a consumer in a disassembled or build-it-yourself form, and may be flat-box shipped for convenience and ease in transport, storage, and the like. Further still, the stools or components thereof may be monolithically formed or manufactured in a single piece design. In these monolithic embodiments, the stools or components thereof may be formed in any appropriate matter, such as through 3-D printing, extruded, casting, molding or the like. In cabinets that employ a center stile, the stile may be straddled with one stool installed on each side of the stile or by using a design that accommodates the stile such that each half of the stool may be moved independently or dependently relative to the other half.

As described herein, stool 100 including the mountable bracket 200 may secure to the base of the cabinet and assure that the user's weight is distributed onto the cabinet base 10 and onto the floor with weight borne directly through the structure onto these horizontal surfaces. As described, the mounting bracket 200 may be a 90° bracket that serves as a securement for the stoop into the cabinet base 10 and as a pivot point for any of stools 100, 400, 500, the radiused base of which pivots on a shaft such as a bolt and nut assembly. For embodiments where stool 100 includes the weighted base 300 instead of the mountable brackets 200, rather than being affixed/secured to the cabinet 5, the stool 100 is held in place in the cabinet 5 by the weighted-base 300 around which the stool 100 may pivot without being permanently or reversibly affixed to the base 10. The weighted base 300 may serve as the securement for the stool 100, 400, 500 within the cabinet 5 while providing a pivot point for the stool 100, 400, 500, the radiused base of which pivots on a shaft protruding from the base through the stool or from a fastener that engages the stoop and the weighted base such as a threaded shaft. Regarding stools 400, 500, the cantilevered design may allow the same general benefits as the prior described embodiments but without the floor-based weight bearing. This design of stools 400, 500 may be more ideal in a cabinet 5 whose base 10 is not a standard distance from the floor.

The steps (e.g., 130, 140) on the stools (e.g. 100) may be constructed of different widths to accommodate various cabinet opening sizes and to avoid drain traps while allowing full closure of the cabinet door(s). Steps are further dimensioned and designed, with for example, chamfered front step edges or concavities, to further minimize interference with the drain trap.

The floor-standing designs for stool 100, for example, includes sockets that receive inserts (foot pads) 250 allowing for adjustments to accommodate various cabinet floor heights as well as unlevel floor surfaces. In each case, the stool 100 pivots around a radiused leg 110, 120 contour. A concave portion of the leg 110, 120 may accommodate the potential variance between the height of the cabinet floor and the cabinet face 10, 20 frame that exists in many cabinets.

The stools 100, 400, 500 may be designed a) with snap fit components to foster simple assembly by the purchaser, b) to be installed using standard household tools, and c) to accommodate flat-packing.

The stool, when flat-packed, is comprised of two major components, in addition to mounting brackets or weighted base and assembly hardware. These components include vertical legs (right and left), and steps. When manufactured out of wood, each of the vertical legs includes blind dados on its inner portion into which a portion of the step is inserted. The wooden steps fit into the leg dados to allow weight transfer from the step to the leg and for improved appearance, maintaining the dado as blind following insertion and installation of the step into the leg. The step is secured into the dado of the vertical legs using fasteners such as screws, barrel nuts, cam locks or other hardware.

For embodiments using mounting bracket 200, the stools 100, 400, 500 may be installed using the mounting bracket 200 installed adjacent to the stool and into the cabinet base 10 using a number of self-tapping screws to secure each bracket 200. The stool may be connected to the bracket 200 using a flat-head bolt or other securement method, including for example, a T-nut embedded as a flush-mount into the inner portion of each leg. For embodiments using the weighted base 300, the stools 100, 400, 500 may be installed cabinet 5 using a base 300 around which the stool 100, 400, 500 pivots. The stool 100, 400, 500 is connected or affixed to the weighted base 300 using a bolt or a protrusion 345 that extends from the weighted base 300. The base 300 may weighted to provide relative securement within the cabinet 5 that may be augmented by adhesive or by other underlayment such as anti-slip materials with high coefficient of friction 340. For any embodiments, to complete installation, the stoop step angles can be adjusted to assure that the steps are level with the floor.

The device, when stowed, allows the cabinet door(s) to close without encroaching the drain trap or pipes 30. The final position can be varied by the installer to accommodate various cabinet heights and trap positions, enabling full cabinet closure when stowed. When deployed, the stoop allows the user to step up and participate in the desired activity at sink/counter height.

Although the embodiments of the present disclosure have been illustrated in the accompanying drawings and described in the foregoing detailed description, it is to be understood that the present disclosure is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A rotatable stool positioned in a cabinet, wherein the cabinet comprises a base, comprising:
- first and second legs,
- a first step perpendicular to and connecting the first and second legs,
- a second step perpendicular to and connecting the first and second legs,
- first and second L-shaped mounting brackets, wherein the first mounting bracket is attached to a first end of the first leg by a first hinge bolt and the second mounting bracket is spaced from the first mounting bracket and is attached to a first end of the second leg by a second hinge bolt and wherein the first and second mounting brackets are attached to the cabinet base;
- wherein the first leg is rotatable relative to the first mounting bracket via the hinge bolt from a stowed position within the cabinet base to a deployed position outside of the cabinet base, wherein in the deployed position the first step is below the second step and wherein in the stowed position the first step is spaced above the cabinet base; and
- height inserts at a second end of each of the first and second legs, wherein the height inserts are individually adjustable in height.

2. The rotatable stool of claim 1, wherein the first and second legs each include a lower edge that is concaved and an upper edge having an apex.

3. The rotatable stool of claim 2, wherein the first step is positioned below the apex of each of the first and second legs.

4. The rotatable stool of claim 1, wherein the first step is aligned with a second end of each of the first and second legs when in a deployed position, wherein the second end is spaced from the first end.

5. The rotatable stool of claim 1, wherein the first step includes a cut-out on a front edge and a surface feature, wherein the cut-out forms a handle.

6. The rotatable stool of claim 1, wherein the first and second mounting L-shaped brackets each have a first face and a second face that are 90° apart, wherein the first face of the first mounting bracket attaches to the first end of the first leg and the second face attaches to the cabinet base and the first face of the second mounting bracket attaches to the first end of the second leg and the second face attaches to the cabinet base.

7. The rotatable stool of claim 1, wherein the rotatable stool is rotatable 90° to 180° from the stowed position within the cabinet base to the deployed position outside of the cabinet base.

8. The rotatable stool of claim 1, wherein the first and second mounting brackets attach to the first and second legs, respectively such that the first and second legs in the deployed positioned are configured to remain spaced from a floor.

9. The rotatable stool of claim 1, wherein the first step is positioned toward a rear of the cabinet base, providing a storage space in the cabinet base between the first and second legs.

10. The rotatable stool of claim 1, wherein the second mounting L-shaped bracket comprises a first face and a second face that are 90° apart, wherein the first face of the second mounting bracket attaches to the first end of the second leg and the second face attaches to the cabinet base wherein when the second leg is in the stowed position the second leg does not block the second face.

11. The rotatable stool of claim 1, wherein the second step is above the first and second mounting brackets when the first and second legs are in the deployed position.

12. The rotatable stool of claim 1, wherein the first and second mounting L-shaped brackets each have a first face and a second face that are 90° apart, wherein the first face of the first mounting bracket attaches to an inner side of the first end of the first leg and the second face attaches to the cabinet base and the first face of the second mounting attaches to an inner side of the first end of the second leg and the second face attaches to the cabinet base.

13. The rotatable stool of claim 1, wherein the first and second mounting L-shaped brackets each have a first face and a second face that are 90° apart, wherein the first face of the first mounting bracket attaches to an outer side of the first end of the first leg and the second face attaches to the cabinet base and the first face of the second mounting attaches to an outer side of the first end of the second leg and the second face attaches to the cabinet base.

14. A rotatable stool positioned in a cabinet, wherein the cabinet comprises a base, comprising:
- first and second legs,
- a first step perpendicular to and connecting the first and second legs,
- a second step perpendicular to and connecting the first and second legs,
- first and second mounting brackets, wherein the first mounting bracket is attached to a first end of the first leg by a first hinge bolt and the second mounting bracket is spaced from the first mounting bracket and is attached to a first end of the second leg by a second hinge bolt and wherein the first and second mounting brackets attach to the cabinet base;

wherein the first leg is rotatable relative to the first mounting bracket via the hinge bolt from a stowed position within the cabinet base to a deployed position outside of the cabinet base, wherein in the deployed position the first step is below the second step and wherein in the stowed position the first step is spaced above the cabinet base; and height inserts at a second end of each of the first and second legs, wherein the height inserts are individually adjustable in height, wherein the first and second mounting brackets each have a first face and a second face that are 90° apart, wherein the second step is above the first and second mounting brackets when the first and second legs are in the deployed position and wherein the first face of the first mounting bracket attaches to an inner or outer side of the first end of the first leg and the second face attaches to the cabinet base and the first face of the second mounting bracket attaches to an inner or outer side of the first end of the second leg and the second face attaches to the cabinet base.

15. The rotatable stool of claim 14, wherein the first and second mounting brackets attach to the first and second legs, respectively such that the first and second legs in the deployed positioned are configured to remain spaced from a floor.

16. The rotatable stool of claim 14, wherein the first step is positioned toward a rear of the cabinet base, providing a storage space in the cabinet base between the first and second legs.

17. The rotatable stool of claim 1, wherein the first mounting L-shaped bracket comprises a first face and a second face that are 90° apart, wherein the first face of the first mounting bracket attaches to the first end of the first leg and the second face attaches to the cabinet base wherein when the first leg is in the stowed position the first leg does not block the second face.

18. A rotatable stool positioned in a cabinet, wherein the cabinet comprises a base, comprising:

first and second legs, a first step perpendicular to and connecting the first and second legs, a second step perpendicular to and connecting the first and second legs, first and second mounting brackets, wherein the first mounting bracket is attached to a first end of the first leg by a first hinge bolt and the second mounting bracket is spaced from the first mounting bracket and is attached to a first end of the second leg by a second hinge bolt and wherein the first and second mounting brackets attach to the cabinet base;

wherein the first leg is rotatable relative to the first mounting bracket via the hinge bolt from a stowed position within the cabinet base to a deployed position outside of the cabinet base, wherein in the deployed position the first step is below the second step and wherein in the stowed position the first step is spaced above the cabinet base; and height inserts at a second end of each of the first and second legs, wherein the height inserts are individually adjustable in height, wherein the first and second mounting brackets each have a first face and a second face that are 90° apart, wherein the second step is above the first and second mounting brackets when the first and second legs are in the deployed position and wherein the first face of the first mounting bracket attaches to the first end of the first leg and the second face attaches to the cabinet base wherein when the first leg is in the stowed position the first leg does not block the second face and the first face of the second mounting bracket attaches to the first end of the second leg and the second face attaches to the cabinet base wherein when the second leg is in the stowed position the second leg does not block the second face.

* * * * *